(12) United States Patent
Dubbaka

(10) Patent No.: US 9,742,112 B1
(45) Date of Patent: *Aug. 22, 2017

(54) AUTOMATIC GRAVITY CONNECTOR

(71) Applicant: Nikhil Dubbaka, Brooklyn, NY (US)

(72) Inventor: Nikhil Dubbaka, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/447,848

(22) Filed: Mar. 2, 2017

Related U.S. Application Data

(63) Continuation of application No. 15/134,445, filed on Apr. 21, 2016, now Pat. No. 9,620,896.

(51) Int. Cl.
H01R 29/00 (2006.01)
H01R 13/631 (2006.01)
H01R 24/58 (2011.01)
H01R 13/62 (2006.01)
B60L 11/18 (2006.01)
H01R 103/00 (2006.01)

(52) U.S. Cl.
CPC ........ *H01R 13/631* (2013.01); *B60L 11/1818* (2013.01); *H01R 13/6205* (2013.01); *H01R 24/58* (2013.01); *H01R 2103/00* (2013.01); *H01R 2201/26* (2013.01)

(58) Field of Classification Search
CPC .............................. H01R 24/58; H01R 103/00
USPC .................................. 439/668, 188, 669, 944
See application file for complete search history.

(56) References Cited

U.S. PATENT DOCUMENTS

| | | | |
|---|---|---|---|
| 6,326,765 B1 | 12/2001 | Hughes et al. | |
| 7,377,805 B2 | 5/2008 | Kim et al. | |
| 7,598,703 B2 | 10/2009 | Zhang et al. | |
| 8,497,660 B2 | 7/2013 | Soong et al. | |
| 8,638,011 B2 | 1/2014 | Robinson et al. | |
| 9,620,896 B1* | 4/2017 | Dubbaka | H01R 13/629 |
| 2005/0248312 A1* | 11/2005 | Cao | H02J 7/0031 320/114 |
| 2008/0309297 A2 | 12/2008 | Brown et al. | |
| 2011/0133573 A1 | 6/2011 | Ratnaparkhi et al. | |
| 2014/0042956 A1 | 2/2014 | Wheatley et al. | |
| 2014/0210399 A1* | 7/2014 | Urschel | H02J 1/00 320/107 |
| 2015/0350750 A1* | 12/2015 | Yun | H04Q 9/00 340/870.07 |

FOREIGN PATENT DOCUMENTS

| | | |
|---|---|---|
| CN | 201590772 | 9/2010 |
| CN | 203707816 | 7/2014 |

* cited by examiner

*Primary Examiner* — Phuongchi T Nguyen
(74) *Attorney, Agent, or Firm* — Lambert & Associates; Gary E. Lambert; David J. Connaughton, Jr.

(57) ABSTRACT

A two sided electrical connection system that automatically connects two connector sides together is provided. A male side and female side of the connector have bodies shaped such that the male side may be received by the female side automatically by a force of gravity. Guiding structure around the female side of the two sided connector allows the male side to be guided into place without requiring perfect alignment of the two sides of the connector.

18 Claims, 5 Drawing Sheets

AUTOMATIC GRAVITY CONNECTOR

BACKGROUND OF THE INVENTION

Field of the Invention

The present invention relates generally to electrical connection structures. More particularly the present invention relates to a device configured to automatically achieve electronic connection using structures that guide the two sides of the electrical connection together without the need for a user to manually joint the two sides.

Description of Related Art

As technology continues to develop, especially in the electrical and computer fields, battery operated systems such as vehicles will become more common place. Further, enhanced computerization of such vehicles often requires a data transfer between vehicle computer and a base station. One way of achieving this data transfer is through a direct connection between the two structures.

Typically, existing electrically powered or electrical communication structures utilize a manually operated plug that requires a user to physically plug a first connector side into a second connector side. Examples of such electrical systems may be vehicles, flying drones, and the like. While this has worked for the time being, a number of downsides exist to such a system. Initially, the manual operation is inconvenient. Further, such manual connection can be dirty and potentially dangerous if the plugs and wiring is damaged.

Therefore, what is needed is a system that can automatically make an electrical connection between two structures without manual input.

SUMMARY OF THE INVENTION

The subject matter of this application may involve, in some cases, interrelated products, alternative solutions to a particular problem, and/or a plurality of different uses of a single system or article.

In one aspect, an automatically connectable vehicle and base station assembly is provided. The assembly includes an automatic two part electrical connector that can be mated to form an electrical connection between vehicle and base station. The electrical connector has a male side and a female side. The male side is connected to the vehicle by an electric cable, and has a guiding structure configured to guide it into electronic connection with the female side automatically, by gravity, magnetic force, and/or mechanical action. The female side is connected to the base station and is configured to receive the male side by the guiding structure of the male side. An electrical connection of the base station is provided to the female side, thereby providing electronic communication between the vehicle and base station. When connected, an electrical contact of the male side is in contact with an electrical contact of the female side, thereby providing the electrical communication between the vehicle and the base station.

In another aspect, a method of automatically electrically connecting a vehicle to a base station is provided. The method may begin with a positioning a vehicle in a proximity to the base station. Next, a male side of a two part electrical connector of the vehicle is released. The male side is connected to the vehicle by an electric cable which can extend away from the vehicle via gravity. The male side further has a guiding structure configured to guide it into electronic connection with a female side of the base station automatically. The female side is connected to the base station and has an electrical connection provided to it. The female side may receive the male side as it descends. This receiving involves the male side being moved, by the guiding structure and a force of gravity, from a position not aligned with the female side to a position aligned with the female side. Once aligned, the two sides may fit together as the male side is lowered to the female side, achieving the connection. Once received by the female side, the two sides will achieve an electronic connection by way of physically contacting electrical contacts on the male and female sides, thereby providing electronic communication between the vehicle and the base station. When the electronic connection is no longer required, the cable may be retracted, breaking the connection between the two sides.

DETAILED DESCRIPTION

Figure 1:
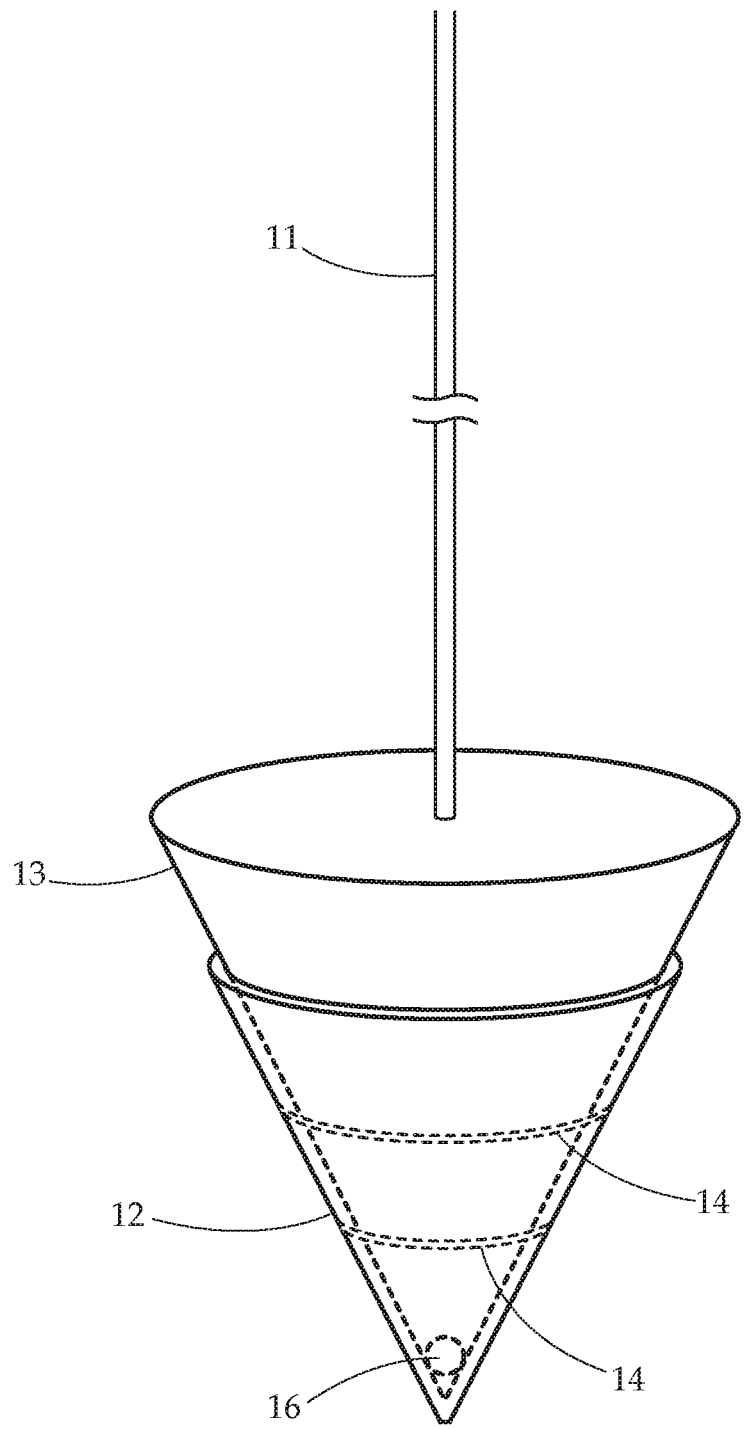
FIG. 1 provides a partial cross sectional view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a two piece electrical connector, the pieces of which are automatically connectable. Each piece, or side, of the electrical connector has a structure configured to aid the automatic electrical connection between the two. A connecting (male) end may have a cable connecting it to its base structure. Similarly, a receiving (female) connector end may have electronics connected, in for example, a base station. When the male and female ends are mated, they will achieve the intended electrical connection. Both ends have a shape and structure configured to guide them together to allow automated connection even when there is a non-ideal alignment of the two sides. The electrical connector of the present invention may be used between any electronically enabled structures to provide electrical communication between the two. In many embodiments, the present invention will be mounted to a vehicle such as an automobile, remote controlled vehicle, drone, and the like. However, it should be understood that the electrical connector may be used on any system without limitation.

The term vehicle is used herein to refer to, not only motor vehicles such as cars, trucks, go carts, and the like, but also any other devices movable under their own power, such as drones, remote control vehicles, wheeled vehicles, propeller powered vehicles, among others. Similarly, devices contemplated herein may be any device having a battery, including vehicles, and also portable electronic devices such as mobile computing devices, and any other electrically powered devices. While the electrical connector is described with reference to a vehicle, it is to be understood that any device may be charged using the electrical connector disclosed herein.

The term automatic is used herein to mean an automated action that does not require external action by a user.

In typical embodiments, a male side of two piece connector connects a mobile structure to a base station having the female side (though the orientation may be reversed). The male side (which is typically on the vehicle) has at least one electrical contact facing outward on a perimeter of its body. The male side is extendable from the vehicle and can be released towards a base station, guided by gravity or a guiding structure to automatically mate with the female side of the base station. In gravity assisted embodiments, the male side is equipped with a weight or is formed having a sufficient mass to allow it to fall in a predictable manner downward into the base station.

An electrical contact or contacts of the male side may protrude slightly from an outer surface of the male side connector, or may be flush with or recessed from the surface. Similarly, an electrical contact or contacts of the female side may protrude slightly from an inner surface of the female side (into which the male side would fit), or may be flush with or recessed from the surface. These contacts may extend fully around the male and female sides, or may be limited to a particular area. When limited in area, the electrical connection between the male and female sides may be dependent on their relative orientation to each other. In such embodiments, a shaping of at least one of the sides may aid in urging the sides into proper orientation. In an embodiment where a particular orientation of electrical connections is required, such as more complex embodiments with multiple electrodes, a shaping or structure configured to allow proper orientation of the male side with the female side can be used. For example, an oval cross sectional shape of the male side may be used. Or, a shape having different shaped opposing sides. A cam structure may be used having tabs and ramps on either part that can rotate the male and/or female sides into proper orientation. For example, an egg shape may urge the male connector into an orientation having its major axis parallel with a surface it is resting on.

Important for the automatic connection aspects of the two sided electrical connector of the present invention is a guiding structure formed in at least one of the male and female sides, and typically on both sides. Generally, the guiding structure is a shaping or other structure that urges the two sides together when they are not perfectly aligned. For example, ramps or other angled structures may be a guiding structure, such that when the male side is not aligned with the female side, it will hit one of the ramps and be urged towards the female side (which would be at the end of the ramp). Similarly, a 360 degree sloping area, shaped as, for example, if an inverted cone or pyramid may be the guiding structure. In such embodiments, the male side may have a ball, roller, weight, or the like at its end to facilitate its sliding along the guiding structure into the female end.

In a further embodiment, the male side may be shaped as a cone, pyramid, or other structure that has outer ends tapering inward towards each other at a distal end of the male side. Similarly, in this embodiment the female side may be an open shape to receive the male side. The female side may be shaped as, for example, a funnel, an inverted cone, pyramid or other structure that has its outer ends tapering inward towards the female connector. In another embodiment, the female side may have one or more ramps guiding a male side connector towards the female side connector. The female side shape may have a larger secondary guiding structure with, for example, a more gradual sloping shape than the male side's guiding structure. Weights on the male side may aid in proper and secure positioning. Other structures such as magnets, electromagnets, snaps, mechanical, and the like may facilitate a proper connection of the male and female side. In a particular embodiment, once the male side reaches a certain point at or near the female side, a mechanical structure may be activated to contact the male side and guide it or drive it into proper orientation in the female side. For example, a lever may be triggered that may cause an arm to contact a top of the male side to drive it towards the female side.

The electrical connection between the two sides may be any type of electronic communication including, but not limited to, electrical charging of a battery or similar energy storage structures, electronic data transmission, input output communications, computerized connections, electronic data storage such as USB and the like. In a particular embodiment, the present invention may be used for automatic high-security data transfer that transfers data via a direct connection and transporting the transmitted information physically. It should be understood that a single electrical connector of the present invention may perform more than one function with a single connector. For example, one connector could achieve both electrical charging of a vehicle as well as electronic data transmission, through a mating of one or a plurality of electrical contacts of the male and female side.

The male side of the two part connector may extend from the vehicle or other structure in any manner. In one embodiment, the male side may be extendable and retractable via an electrical cable mounted to a spool or other extending/retracting structure. The spool, in one embodiment, may be motorized. In one embodiment, the male side connector may extend downward from a bottom of the vehicle. In another embodiment, the male side connector may be mounted on an arm that can extend outwardly away from a body of the vehicle, and then drop or otherwise release the male side. In a non-gravity assisted embodiment, the male side connector may extend from the vehicle by a solid or extendable arm upward, outward, or in any other direction. In these embodiments, when not in use the male side connector may be retracted to a non-operational position which may protect and/or hide the male side connector.

Turning now to FIG. 1, an embodiment of the two part electrical connector of the present invention is provided. In this view, the two parts of the connector are shown being automatically mated together, providing an electrical connection between the two. The male side 13 is shaped as a cone, and has a cable 11 connected to it. The cable 11 is connected to a vehicle or other base (not shown), and can provide electric power and/or electrical communication between the male side of the connector and base. Male side 13 is mated with female side 12. A rolling ball 16 is positioned in the male side 13, which helps the male side 13 fall into place to be secured in position. Female side 12 is shaped as an inverted cone or funnel and operates to guide and urge the male side 13 into proper position by virtue of its inward sloping sides. Generally, the female side 12 has a shape defining an inner space that corresponds to an exterior surface of at least a portion of the male side 13. Typically, this corresponding shape allows at least a portion of the male side to be flushly received by the female side 12. Electrical contacts 14 are shown as a cross sectional view on an inside of the female side, the male side 13 electrical contacts and female side electrical contacts are shown in a mated position, touching each other. In this view, the electrical contacts 14 extend about the perimeter of both the male and female sides 13, 12, however it should be understood that any orientation of electrical contact may be used. The female side 12 is connected to a base station (not shown.) Base station may provide, among other options, a charging and/or a computerized connection.

Figure 2:
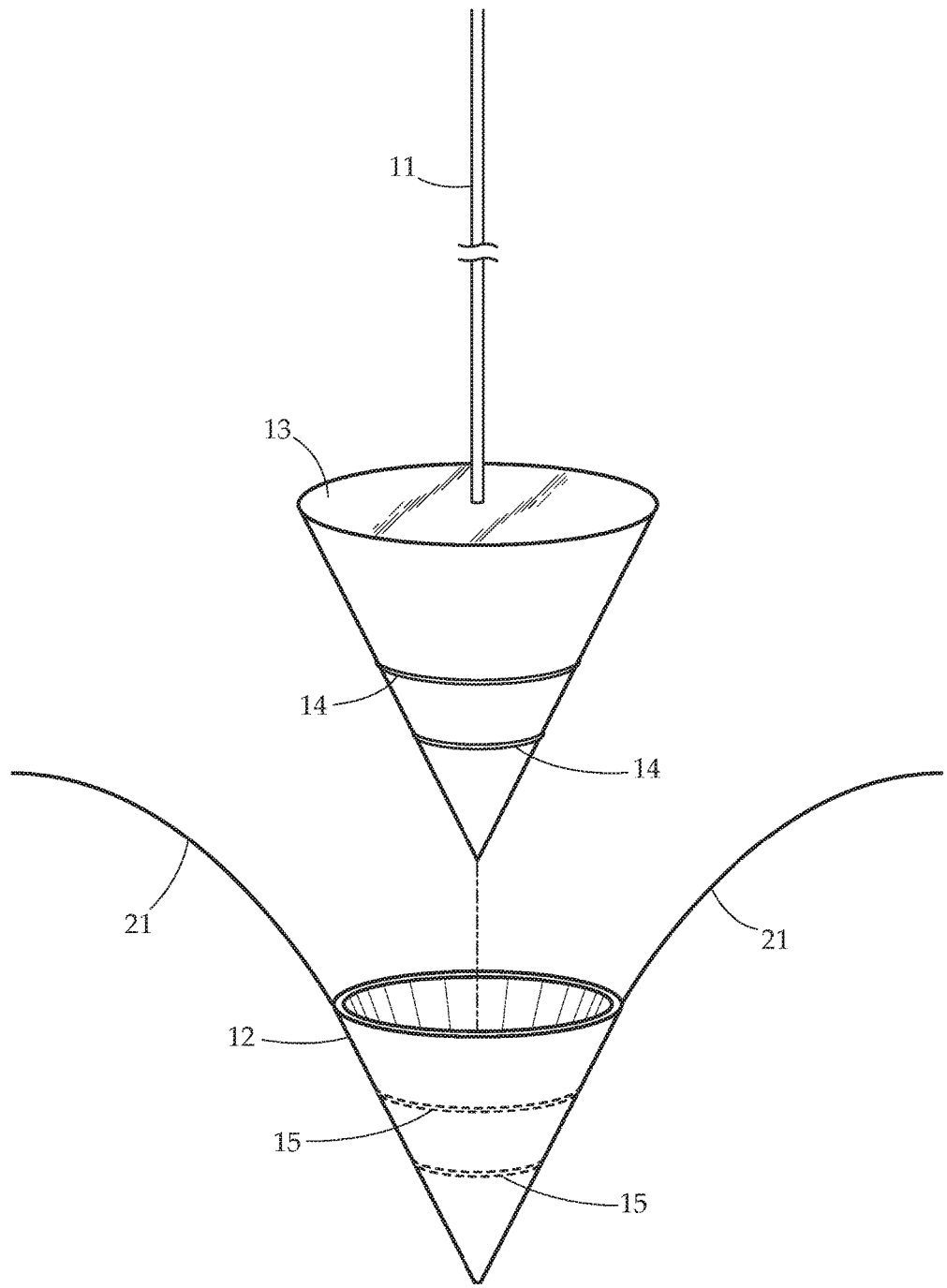
FIG. 2 provides an elevation view of an embodiment of the present invention.

FIG. 2 shows another embodiment of the two part electrical connector of the present invention. In this view, the two sides are shown apart. The male side 13 is suspended by cable 11, cable 11 also providing electrical communication to whatever structure (vehicle or the like) it is connected to. Electrical contacts 14 extend around an outer surface of the male side 13. Female side 12 can be seen as an open, inverted cone or funnel shape. Electrical contacts 15 are shown in broken lines, indicating their position on an inner face of the female side 12. A secondary guiding structure 21 is provided adjacent to the female side 12 as part of a base station. The secondary guiding structure 21 operates in addition to the shape of the female side 12 (which operates as its own guiding structure) to guide the male side 13 into proper position if not exactly aligned. This may be particularly advantageous in a vehicle implementation of the invention. When parking a car or other vehicle, it is often difficult to position the vehicle exactly in a correct spot. Thus, the secondary guiding structure 21 allows the vehicle to be parked in a range of locations and will still urge the male side 13, when descending from the vehicle, into the proper position mating with the female side 12. It should be understood that secondary guiding structure 21, while shown as two dimensional in the figure, may be three dimensional and may urge male side 13 into the female side 12 from all directions.

Figure 3:
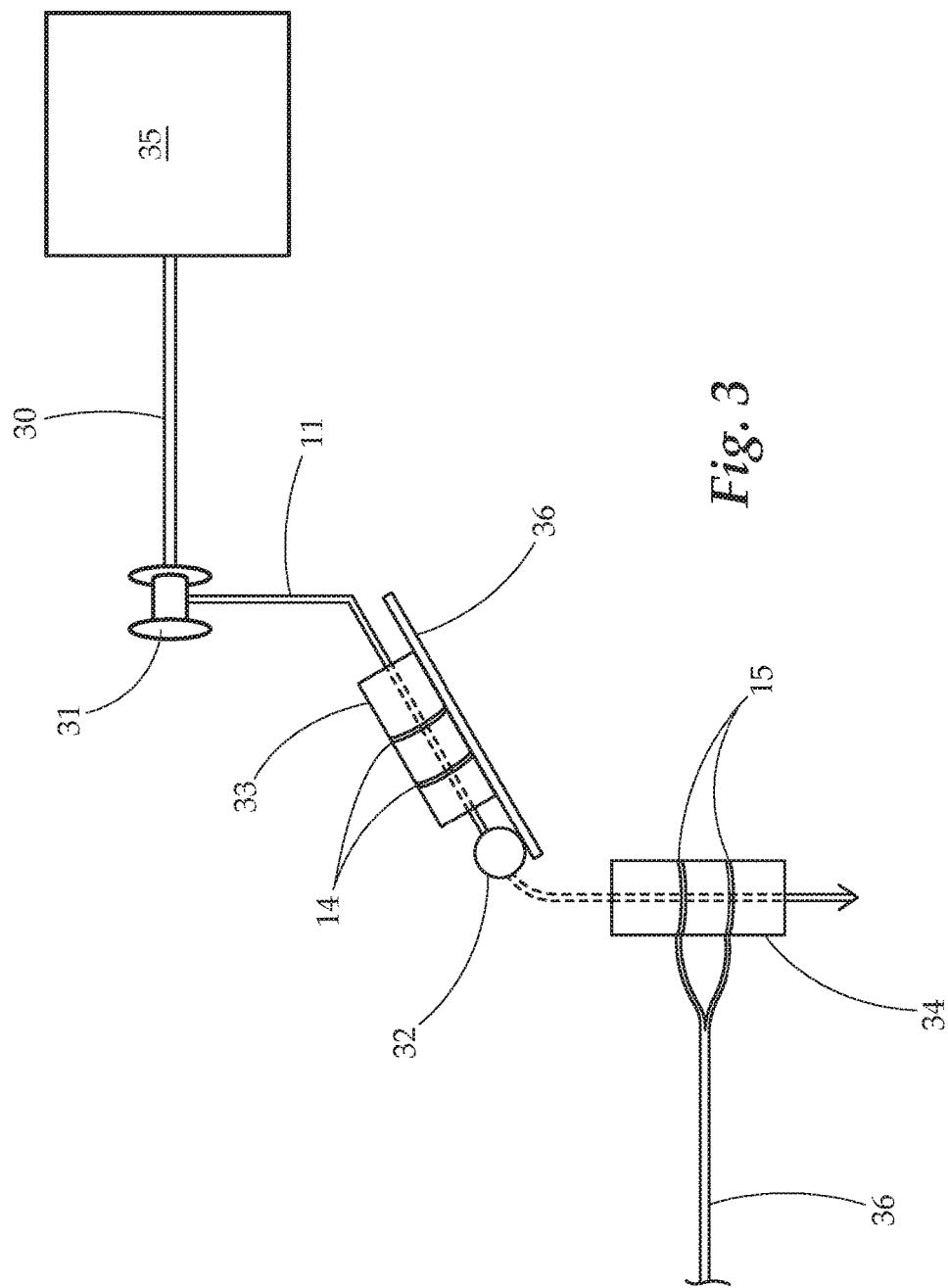
FIG. 3 provides an elevation view of another embodiment of the present invention.

FIG. 3 provides a view of yet another embodiment of the present invention. In this view, a ramp 36 is used as the guiding structure to urge the male side 33 into the female side 34. A vehicle or other structure 35 is shown having an arm 30 extending from it. At the end of the arm 30 is spool 31. Spool 31 may be motorized and is configured to extend and retract male side 33 via cable 11. Cable 11 is in electronic communication with the structure 35. In this view, male side 33 is shown as a cylinder, as is female side 34—female side 34 being shaped as a tube with an opening through its middle. Male side 33 is sized to have an outer diameter approximately equal to or less than the inner diameter of female side 34. As such, the male side 33 can fit into the opening of female side 34. When properly positioned, male side electrical contacts 14 will align with female side electrical contacts 15, providing an electrical connection. Wiring 36 connects female side 34 and electrical contacts with a base station (and electrical connection, electronic communication, or the like). The ramp 36 operates as a guiding structure in this embodiment. A rolling ball 32 is attached at an end of the male side 33. The rolling ball aids in proper positioning of the male side 33 by being able to roll down ramp 36. While only one ramp 36 is shown, it should be understood that more than one may be provided to guide the male side 33. Rolling ball 32 is sized to be small enough to fit through the interior opening of the female side so that it can pass through and draw the male side 33 into proper placement.

Figure 4:
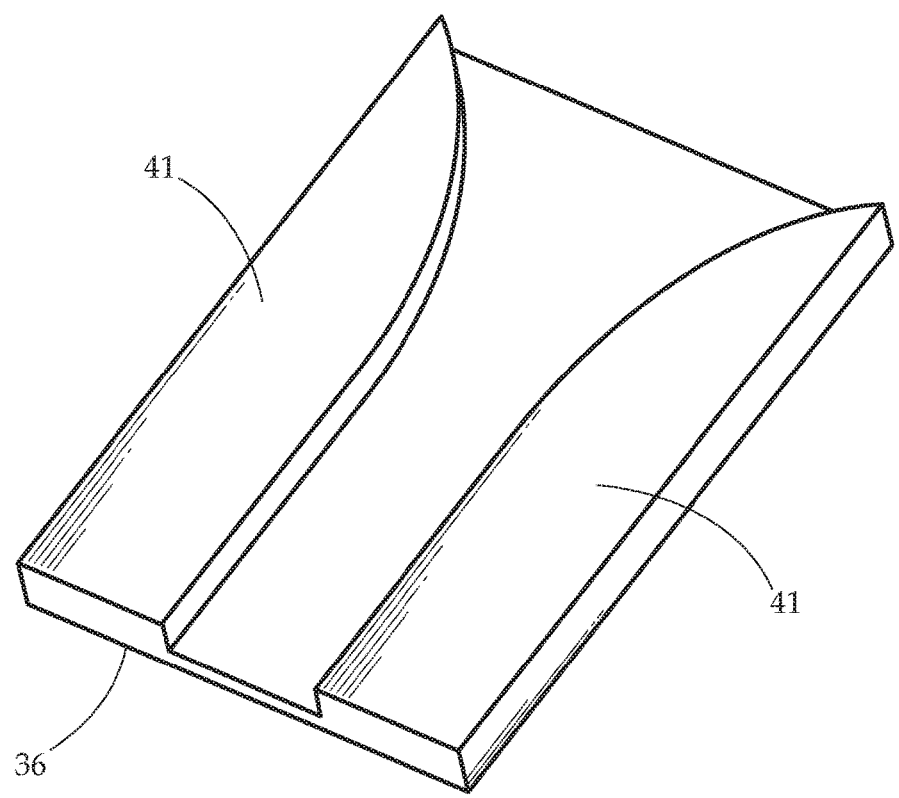
FIG. 4 provides a view of an embodiment of a guiding structure of the present invention.

FIG. 4 provides an embodiment of the guiding structure. In this view, the guiding structure 36 is a ramp. The ramp has raised portions 41 to further guide the male side (not shown) into place. In this view, the raised portions 41 funnel the male side into the center of the ramp 36.

Figure 5:
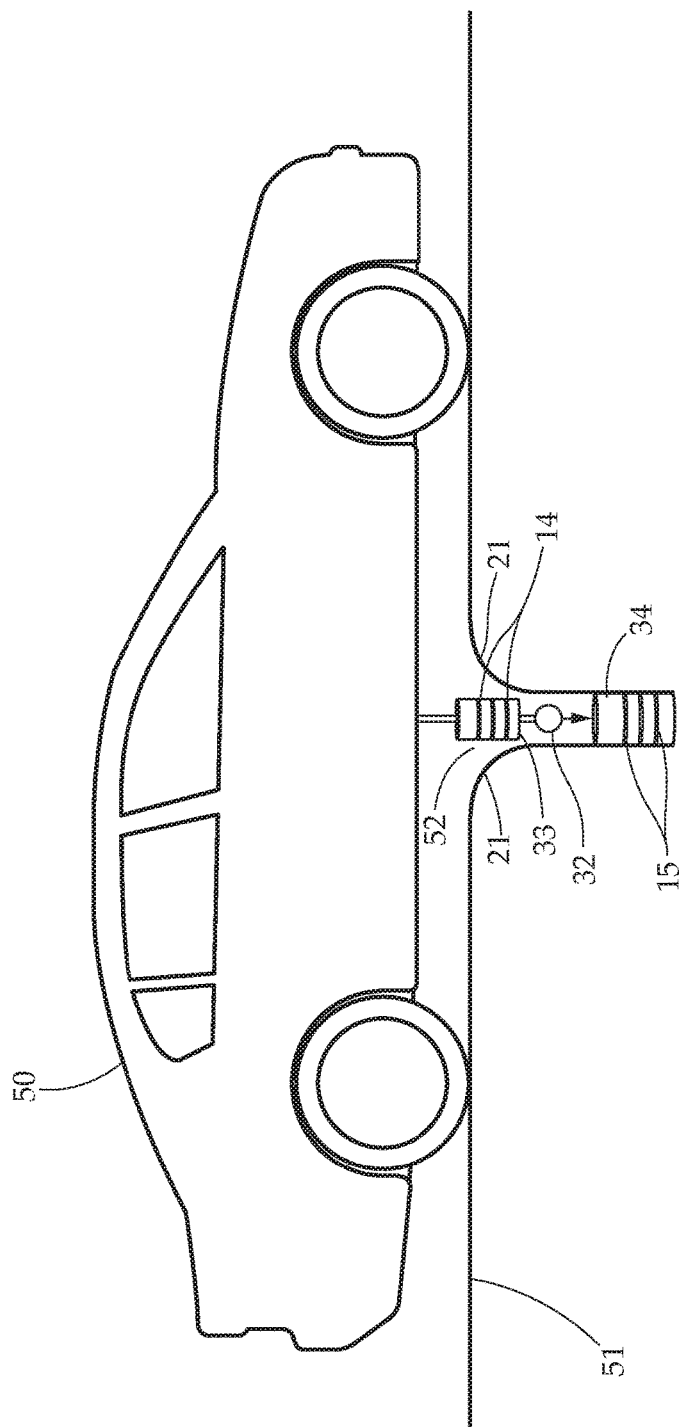
FIG. 5 provides a view of an embodiment of the present invention implemented on a vehicle.

FIG. 5 provides a view of another embodiment of the invention implemented as a car charging station. In this view, a vehicle 50 is parked over the car charging station. The male side 33 is configured to descend from a bottom of the vehicle 50 into the female side 34 to provide charging and other electronic communication to and from the vehicle 50. An opening 52 is formed in the ground/floor 51 where the vehicle 50 is parked. Secondary guiding structure 21 slopes downwardly towards opening 52 and female side 34. The secondary guiding structure 21 allows the vehicle 50 to be parked in a variety of positions while still being able to achieve connection between male side 33 and female side 34. Rolling ball 32 can roll along the secondary guiding structures 21 and may pass through an opening of the female side 34. When properly positioned, electrical contacts 14 of the male side 33 will be contacting the electrical contacts 15 of the female side 34, thereby achieve electrical connection between the vehicle 50 and the electrical contacts 15 which may be connected to a charging source, computer storage, computer, and the like.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An automatic gravity connector assembly comprising:
   an automatic two part electrical connector providing electrical connection between an electronic device and a base station, the electrical connector comprising a male side and a female side, one of the male side and the female side connected to the device by an electric cable, the male side having a guiding structure configured to guide it into electronic connection with the female side automatically by gravity;
   an electrical contact on an outer surface of the male side being in contact with an electrical contact on an inner surface of the female side, thereby providing electrical communication between the device and the base station; and
   the other of the male side and the female side connected to the base station and configured to receive at least a portion of the one of the male side and female side by the guiding structure of the male side and a corresponding shape of the female side, an electrical connection of the base station being provided to the female side.

2. The automatic gravity connector assembly of claim 1 wherein the guiding structure of the male side is a conical shaped body, the electrical contact of the male side being on an exterior of the body, and wherein the female side is shaped as a funnel to receive the cone shaped body, the electrical contact of the female side being on an inner face of the funnel.

3. The automatic gravity connector assembly of claim 1 wherein the male side guiding structure is a rolling ball configured to roll along a surface towards the female side, the rolling ball sized to pass through at least a portion of the female side.

4. The automatic gravity connector assembly of claim 1 wherein the cable is extendable and retractable from a bottom of the device.

5. The automatic gravity connector assembly of claim 1 wherein the cable is connected to an arm and extendable and retractable from this arm, the arm extendable and retractable from a side of the device.

6. The automatic gravity connector assembly of claim 1 wherein the cable and male side are retractable and extendable from the device.

7. The automatic gravity connector assembly of claim 1 further comprising a magnet on at least one of the male side and the female side, the magnet holding the male side to the female side.

8. The automatic gravity connector assembly of claim 1 wherein the electrical connection between the device and base station is a charging connection, the base station providing a charging to a battery of the device.

9. The automatic gravity connector assembly of claim 1 wherein the electrical connection between the device and base station is a data communication connection.

10. The automatic gravity connector assembly of claim 1 wherein the electrical contact protrudes from the outer surface of the male side.

11. The automatic gravity connector assembly of claim 1 further comprising a secondary guiding structure positioned about the female side, the secondary guiding structure sloping inward towards the female connector and configured to guide the male side into the female side by gravity causing the male side guidance to slide along the inward sloping and gravity.

12. The automatic gravity connector assembly of claim 1 wherein the device is a mobile computing device.

13. The automatic gravity connector assembly of claim 1 wherein the device is a vehicle.

14. The automatic gravity connector assembly of claim 1 wherein the male side has a cylindrical shaped body, the electrical contact of the male side being on an exterior of the body, and wherein the female side has a cylindrical body defining a cylindrical opening sized to receive the male side body.

15. The automatic gravity connector assembly of claim 3 wherein the surface is a ramp configured to guide the rolling ball towards the female side.

16. An automatic gravity connector assembly comprising:
an automatic two part electrical connector providing electrical connection between a vehicle and a base station, the electrical connector comprising a male side and a female side, one of the male side and the female side connected to the vehicle by an electric cable, the male side having a guiding structure configured to guide it into electronic connection with the female side automatically by gravity;
an electrical contact on an outer surface of the male side being in contact with an electrical contact on an inner surface of the female side, thereby providing electrical communication between the device and the base station; and
the other of the male side and the female side connected to the base station and configured to receive at least a portion of the one of the male side and female side.

17. The automatic gravity connector assembly of claim 16 wherein the guiding structure of the male side is a conical shaped body, the electrical contact of the male side being on an exterior of the body, and wherein the female side is shaped as a funnel to receive the cone shaped body, the electrical contact of the female side being on an inner face of the funnel.

18. The automatic gravity connector assembly of claim 16 wherein the male side has a cylindrical shaped body, the electrical contact of the male side being on an exterior of the body, and wherein the female side has a cylindrical body defining a cylindrical opening sized to receive the male side body.

* * * * *